(12) United States Patent
Seigel et al.

(10) Patent No.: US 9,830,213 B2
(45) Date of Patent: Nov. 28, 2017

(54) COLLECTING AND TRANSMITTING DIAGNOSTICS INFORMATION FROM PROBLEMATIC DEVICES

(71) Applicant: QUEST SOFTWARE INC., Aliso Viejo, CA (US)

(72) Inventors: Jake Seigel, Halifax (CA); Sohail Ali, Halifax (CA); Derek Jury, Beachville (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

(21) Appl. No.: 14/872,525

(22) Filed: Oct. 1, 2015

(65) Prior Publication Data

US 2017/0097864 A1 Apr. 6, 2017

(51) Int. Cl.
*G06F 11/00* (2006.01)
*G06F 11/07* (2006.01)
*H04W 4/00* (2009.01)

(52) U.S. Cl.
CPC ...... *G06F 11/0772* (2013.01); *G06F 11/0748* (2013.01); *G06F 11/0751* (2013.01); *G06F 11/0787* (2013.01); *H04W 4/008* (2013.01)

(58) Field of Classification Search
CPC ............. G06F 11/0772; G06F 11/0787; G06F 11/0748; G06F 11/0751; H04W 4/008
USPC .......................................................... 714/48
See application file for complete search history.

(56) References Cited

U.S. PATENT DOCUMENTS

| | | | |
|---|---|---|---|
| 2014/0074346 A1* | 3/2014 | Chiaverini | G07C 5/008 701/31.5 |
| 2015/0140986 A1* | 5/2015 | Lamb | H04L 12/2898 455/418 |
| 2016/0041070 A1* | 2/2016 | Wascat | G01M 7/00 702/183 |
| 2016/0285676 A1* | 9/2016 | Kerpez | H04M 3/304 |
| 2016/0364250 A1* | 12/2016 | Seibert | G06F 9/4446 |

OTHER PUBLICATIONS

Wikipedia "Near field communication" page, retrieved from https://en.wikipedia.org/wiki/Near_field_communication#Bluetooth_comparison on Jul. 22, 2017.*
T. Yaptangco, Dell, An Introduction to OpenManage for Dell PowerEdge Servers, May 2002 http://www.dell.com/content/topics/global.aspx/power/en/ps2q02_yaptangco?c=us&l=en&cs=04.
PC-Doctor, Inc, Bootpath Diagnostics, Powerful Testing for Non-Booting Systems, printed Sep. 9, 2015 https://www.pc-doctor.com/solutions/bootpath-diagnostics.
IFIXIT: The Free Repair Manual, printed Sep. 9, 2015 https://www.ifixit.com/?utm_source=bing&utm_medium=cpc&utm_campaign=iFixit%20Brand%20Name&utm_term=fixitcom.

* cited by examiner

*Primary Examiner* — Yair Leibovich
(74) *Attorney, Agent, or Firm* — Maschoff Brennan

(57) ABSTRACT

A system, method, and computer-readable medium are disclosed for collecting and transmitting diagnostics information via a diagnostic information operation. The diagnostic information operation begins with a system periodically writing diagnostic information such as diagnostic errors and warnings to non-volatile local storage contained within the system. Upon detection of a failure, the user activates an NFC-enabled device (such as a mobile device) and positions the NFC-enabled device within NFC range of the failed system. The failed system then communicates the diagnostic information stored within the non-volatile local storage to NFC-enabled device.

15 Claims, 2 Drawing Sheets

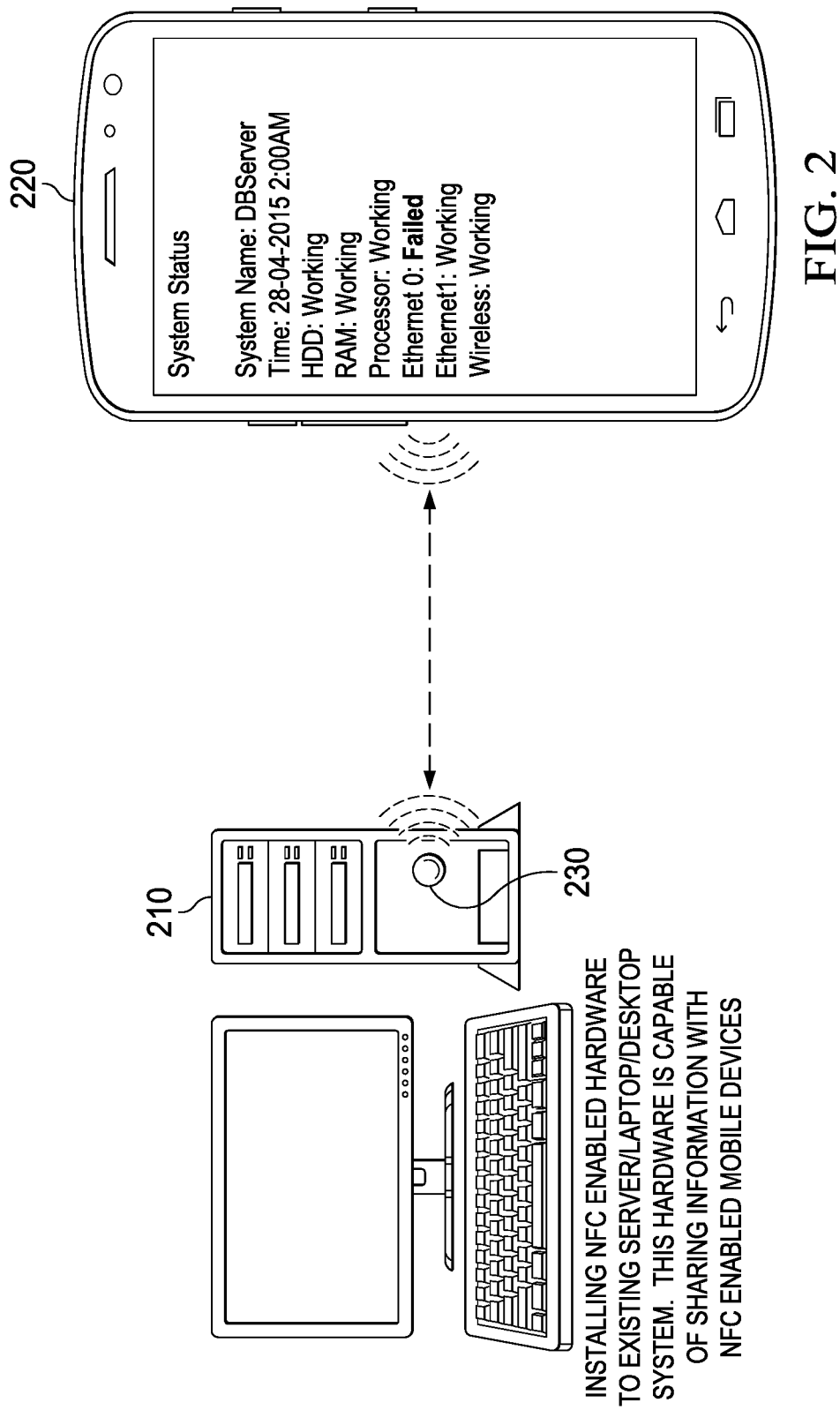

COLLECTING AND TRANSMITTING DIAGNOSTICS INFORMATION FROM PROBLEMATIC DEVICES

BACKGROUND OF THE INVENTION

Field of the Invention

The present invention relates to information handling systems. More specifically, embodiments of the invention relate to collecting and transmitting diagnostics information.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known that information handling systems (such as server type information handling systems, work station type information handling systems, laptop type information handling systems, game console type information handling systems, mobile device type information handling systems, etc.) can sometimes fail unexpectedly. When these systems fail, it can be difficult to determine the cause of the failure without time consuming troubleshooting and diagnostics. Sometimes the troubleshooting and diagnostics can involve replacing internal components just to be able to troubleshoot the device.

SUMMARY OF THE INVENTION

A system, method, and computer-readable medium are disclosed for collecting and transmitting diagnostics information via a diagnostic information operation. The diagnostic information operation begins with a system periodically writing diagnostic information such as diagnostic errors and warnings to non-volatile local storage (e.g., flash memory) contained within the system. In certain embodiments, the diagnostic information operation is performed by a software service on the system executing diagnostics tools in the background (i.e., without a user being aware of the execution of the diagnostics tools). If the system eventually fails and shuts down, the user might have no idea what caused this failure. Upon detection of a failure, the user activates a near field communication enabled (NFC-enabled) device (such as a mobile device) and positions the NFC-enabled device within NFC range of the failed system. The failed system then communicates the diagnostic information stored within the non-volatile local storage to NFC-enabled device. In certain embodiments, the diagnostic information is received by a diagnostic application executing on the NFC-enabled devices that allows reading and summarization of the collected diagnostic information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 shows a block diagram of an overview of a diagnostics information environment.

DETAILED DESCRIPTION

Figure 1:
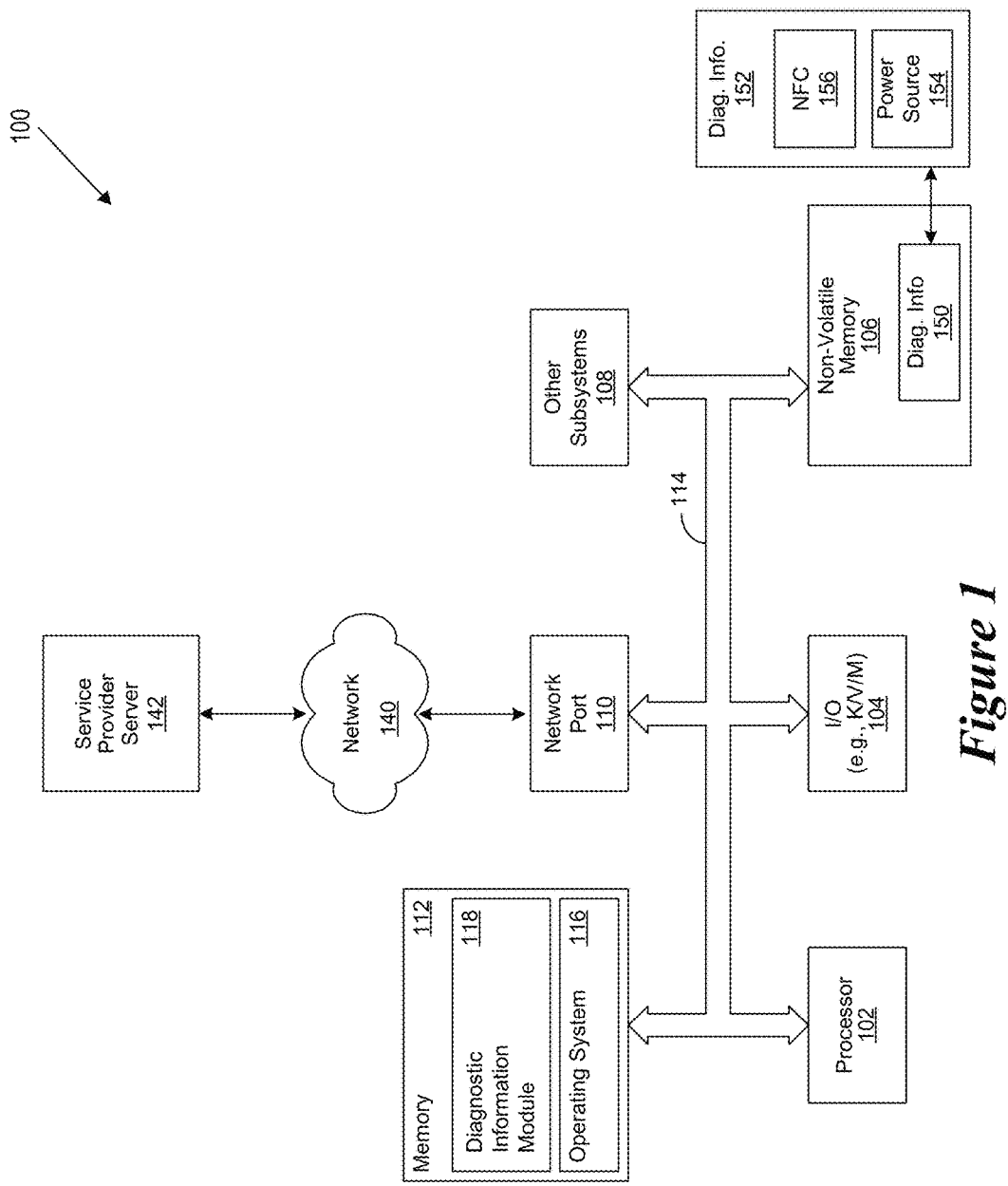
FIG. 1 shows a general illustration of components of an information handling system as implemented in the system and method of the present invention.

Aspects of this disclosure include a recognition that it is known to collect diagnostic information from an information handling system via diagnostic operations, while the system is still in working order. Often warnings or errors found from the diagnostic operations are written to flash memory. If the system eventually fails, the system can send warnings or errors stored in the flash memory to a mobile device using near field communications (NFC). In certain embodiments NFC may be defined as a set of protocols that enable electronic devices to establish communication (such as radio communication) with each other by touching the devices together or bringing the devices into proximity to a distance of typically 10 cm or less. This diagnostic information can provide an immediate indication of the reason for the unexpected failure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise diagnostic information module 118. Additionally, in certain embodiments, the non-volatile memory 106 includes a diagnostic information portion 150 which is coupled with a diagnostic information system 152. The diagnostic information system 152 further includes a power source 154 and an NFC component 156. In various embodiments, the power source 154 comprises a battery which can power the non-volatile memory portion and the NFC component 156 to enable transmission of the diagnostic information even when the information handling system 100 is powered down. It will be appreciated that in certain embodiments, the diagnostic information portion may be included within the diagnostic information system 152. In certain embodiments, the battery is rechargeable using the power source of the information handling system.

The diagnostic information module 118 controls collecting and transmitting diagnostics information via a diagnostic information operation. The diagnostic information operation begins with a system periodically writing diagnostic information such as diagnostic errors and warnings to non-volatile local storage (e.g., flash memory) contained within the system. In certain embodiments, the diagnostic information operation is performed by a software service on the system executing diagnostics tools in the background (i.e., without a user being aware of the execution of the diagnostics tools). If the system eventually fails and shuts down, the user might have no idea what caused this failure. Upon detection of a failure, the user activates an NFC-enabled device (such as a mobile device) and positions the NFC-enabled device within NFC range of the failed system. The failed system then communicates the diagnostic information stored within the non-volatile local storage to NFC-enabled device. In certain embodiments, the diagnostic information is received by a diagnostic application executing on the NFC-enabled devices that allows reading and summarization of the collected diagnostic information.

FIG. 2 shows a block diagram of an overview of a diagnostics information environment 200. The diagnostics information environment includes a monitored system 210 and well as an NFC-enabled device 220 such as an NFC-enabled mobile device. The monitored system 210 may be an information handling system such as information handling system 100. The monitored system 210 includes diagnostics information system 230 which includes NFC-enabled hardware, a non-volatile memory and power supply installed for the purpose of storing the errors and warnings and transmitting them.

Upon detection of a failure, the user activates the NFC-enabled device 220 and positions the NFC-enabled device 220 within NFC range of the failed system. The failed system 210 then communicates the diagnostic information stored within the non-volatile local storage to the NFC-enabled device 220. In certain embodiments, the diagnostic information is received by a diagnostic application executing on the NFC-enabled devices that allows reading and summarization of the collected diagnostic information. In various embodiments, the diagnostic information comprises one or more of a system name, a time of failure, hard drive status information, random access memory status information, processor status information, network communication status information and wireless status information.

In certain embodiments, the diagnostic information is collected periodically (e.g., every hour) and stored to the local storage. In certain embodiments, the diagnostic information is stored to the non-volatile memory via a sliding window approach in which the oldest diagnostic information is replaced with the most recent diagnostic information to ensure that storage capacity of the memory is not exceeded. In certain embodiments the size of the storage used to store the diagnostic information depends on the type of device containing the diagnostics module. For example, if the device is very small with a small set of features, a small amount of space (e.g., a few megabytes) is likely sufficient. In other cases, a more general purpose device may generate more diagnostic information which would require more space (e.g., perhaps 50-100 megabytes). In general, diagnostic information event logs don't take up much storage space, so the increased size is to collect as much history as possible to make the analysis easier. Additionally, in certain embodiments, if the monitored system 210 fails unexpectedly and is in an off state, the diagnostics information system 230 the diagnostics information system 230 automatically and immediately transmits the latest diagnostic errors and warnings from the failed system 210 to the NFC-enabled device 220 without needing the failed system 210 to be powered on.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, other types of communication could be used instead of NFC type communications. E.g., Bluetooth or WiFi type communications may be viable for devices which already include such a communications device such as a laptop type information handling system. However, often these other types of communications can require more power to operate, so they are likely best used when the device generating the diagnostics information is operating.

Consequently, the invention is intended to be limited only by the spirit and scope of the appended claims, giving full cognizance to equivalents in all respects.

What is claimed is:

1. A computer-implementable method for collecting and transmitting diagnostics information, comprising:
storing diagnostic information to a non-volatile local storage contained within a system being monitored;
determining if a system failure has occurred; and,
communicating the diagnostic information to a near field communication (NFC) enabled device upon detecting the system failure, the communicating the diagnostic information being via a NFC communication component within the system being monitored, the NFC communication component being configured to operate even when the system is not functioning; and wherein
the storing the diagnostic information is performed by a software service on the system executing in the background.

2. The method of claim 1, wherein:
the communicating is initiated when the NFC enabled device is positioned within range of the system.

3. The method of claim 1, wherein:
the communicating is initiated immediately upon detection of the system failure.

4. The method of claim 1, wherein:
the NFC enabled device comprises a diagnostic application executing on the NFC-enabled device, the diagnostic application allowing reading and summarization of the diagnostic information.

5. The method of claim 1, wherein:
the diagnostic information comprises one or more of a system name, a time of failure, hard drive status information, random access memory status information, processor status information, network communication status information and wireless status information.

6. A system comprising:
a hardware processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the hardware processor and configured for:
storing diagnostic information to a non-volatile local storage contained within a system being monitored;
determining if a system failure has occurred; and,
communicating the diagnostic information to a near field communication (NFC) enabled device upon detecting the system failure, the communicating the diagnostic information being via a NFC communication component within the system being monitored, the NFC communication component being configured to operate even when the system is not functioning; and wherein
the storing the diagnostic information is performed by a software service on the system executing in the background.

7. The system of claim 6, wherein:
the communicating is initiated when the NFC enabled device is positioned within range of the system.

8. The system of claim 6, wherein:
the communicating is initiated immediately upon detection of the system failure.

9. The system of claim 6, wherein:
the NFC enabled device comprises a diagnostic application executing on the NFC-enabled device, the diagnostic application allowing reading and summarization of the diagnostic information.

10. The system of claim 6, wherein:
the diagnostic information comprises one or more of a system name, a time of failure, hard drive status information, random access memory status information, processor status information, network communication status information and wireless status information.

11. A non-transitory, computer-readable storage medium embodying computer program code, the computer program code comprising computer executable instructions configured for:

storing diagnostic information to a non-volatile local storage contained within a system being monitored;

determining if a system failure has occurred; and, communicating the diagnostic information to a near field communication (NFC) enabled device upon detecting the system failure, the communicating the diagnostic information being via a NFC communication component within the system being monitored, the NFC communication component being configured to operate even when the system is not functioning; and wherein the storing the diagnostic information is performed by a software service on the system executing in the background.

12. The non-transitory, computer-readable storage medium of claim 11, wherein:

the communicating is initiated when the NFC enabled device is positioned within range of the system.

13. The non-transitory, computer-readable storage medium of claim 11, wherein:

the communicating is initiated immediately upon detection of the system failure.

14. The non-transitory, computer-readable storage medium of claim 11, wherein:

the NFC enabled device comprises a diagnostic application executing on the NFC-enabled device, the diagnostic application allowing reading and summarization of the diagnostic information.

15. The non-transitory, computer-readable storage medium of claim 11, wherein:

the diagnostic information comprises one or more of a system name, a time of failure, hard drive status information, random access memory status information, processor status information, network communication status information and wireless status information.

\* \* \* \* \*